Aug. 5, 1941.  E. H. MUELLER  2,251,462

VALVE STEM AND HANDLE

Filed July 20, 1939

INVENTOR.
Ervin H. Mueller
BY
Barnes, Kisselle, Laughlin & Reich
ATTORNEYS

Patented Aug. 5, 1941

2,251,462

UNITED STATES PATENT OFFICE 2,251,462

VALVE STEM AND HANDLE

Ervin H. Mueller, Grosse Pointe, Mich.

Application July 20, 1939, Serial No. 285,521

1 Claim. (Cl. 287—53)

This invention relates to valves and particularly valves used as gas cocks on gas ranges.

The principal object of the invention is to provide an improved arrangement for the mounting of the handle on the stem through the means of a frictional engagement so that the handle may be merely pushed on to the stem or pulled therefrom. Various proposals for such an arrangement have been heretofore made such, for example, as slotting the stem to form relatively yieldable elements, but this is objectionable because the metal is usually brass or similar alloy and has no substantial elastic properties. In accordance with this invention a separate spring is used but the arrangement is such that the spring can be easily assembled and cannot become misplaced or removed from its position in the normal use of the valve. The structure is simple, efficient, economical and positive in action, and in normal use of the arrangement will last practically indefinitely. An arrangement for carrying out the invention is disclosed in the accompanying drawing. The invention is not limited to gas cocks.

Figure 1:
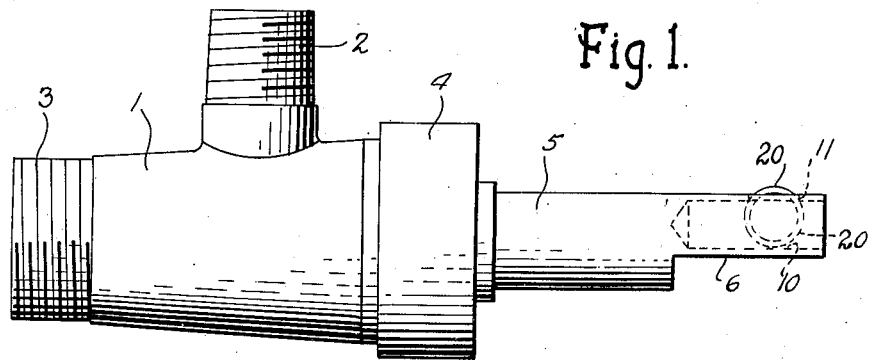
Fig. 1 is a view of a valve and its stem.

The valve itself may be of any desired type, and as illustrated herein, the valve has a body 1 with an inlet 2 and an outlet 3, and the body is closed by a cap 4. The valve member (not shown) is rotatably operable by means of a stem 5 which is advantageously round in cross section. The end of the stem, however, is cut away on one side to form a flat surface 6 so that the projecting end of the stem is of D formation. The handle 7 has a hub 8 with a recess 9 of the same D formation so that when the handle is placed placed over the projecting end of the stem the stem and handle are non-rotatably associated.

The arrangement for securing the handle to the stem resides in providing a bore or recess 10 in the end of the stem, this arrangement leaving solid metal surrounding the bore so that this portion of the stem is not rendered collapsible. The wall of the metal surrounding the bore has a slot or opening formed therethrough on one side of the bore, as illustrated at 11, and advantageously this slot is through the curved portion of the D formation as illustrated.

Figure 2:
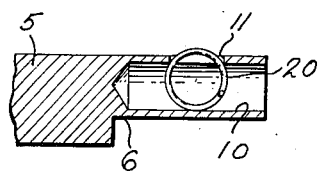
Fig. 2 is a sectional view showing the spring assembled with the stem.
Figure 4:
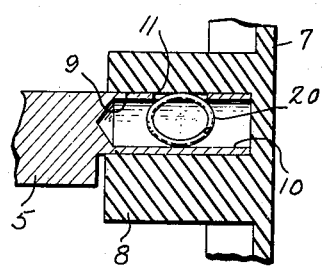
Fig. 4 is a view showing the handle applied.
Figure 3:
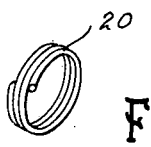
Fig. 3 is a view of the spring element.

The spring is preferably circular in form and is advantageously comprised of several helical convolutions. The spring is illustrated at 20, and as shown in Fig. 3, is comprised of about three helical convolutions with the convolutions abutting each other, or in other words, in contact with each other. The diameter of the spring is such that when it is pushed into the bore 10 the circular form is flattened and when it comes into alignment with the opening or slot 11, it projects through the slot as shown in Fig. 2. The width of the slot preferably nicely accommodates the width of the spring, which is made up of the several superposed convolutions. The length of the slot and diameter of the bore 10, together with the diameter of the spring, are so proportioned, preferably, that the spring is under slight compression when it is positioned as shown in Fig. 2. A part of the spring projects through the opening to be engaged by the handle. When the handle is pushed into position, as shown in Fig. 4, the spring is slightly collapsed as indicated, and the handle is firmly gripped. The spring serves to retain itself in position and does not need to bottom against the end of the bore 10. Accordingly, the precision in forming the bore need not be held to close limits.

I claim:

In a valve, a stem, a handle having a recess arranged to fit non-rotatably on the stem, said stem having an axial bore therein and having a single opening in a wall defining the bore and which is elongated axially of the stem, and a spring in the form of a length of wire fashioned into a plurality of helical convolutions and positioned in the bore with the axis of the spring transverse to the axis of the bore, the diameter of the spring being such that a portion of the convolutions project through the opening to frictionally engage the handle.

ERVIN H. MUELLER.